Oct. 28, 1941.     F. H. ROBY     2,260,405
METHOD AND SYSTEM OF WELDER CONTROL
Filed Nov. 3, 1937     3 Sheets-Sheet 1

INVENTOR
Frank H. Roby
BY Myron J. Seibold
ATTORNEY

Oct. 28, 1941.  F. H. ROBY  2,260,405
METHOD AND SYSTEM OF WELDER CONTROL
Filed Nov. 3, 1937  3 Sheets-Sheet 2
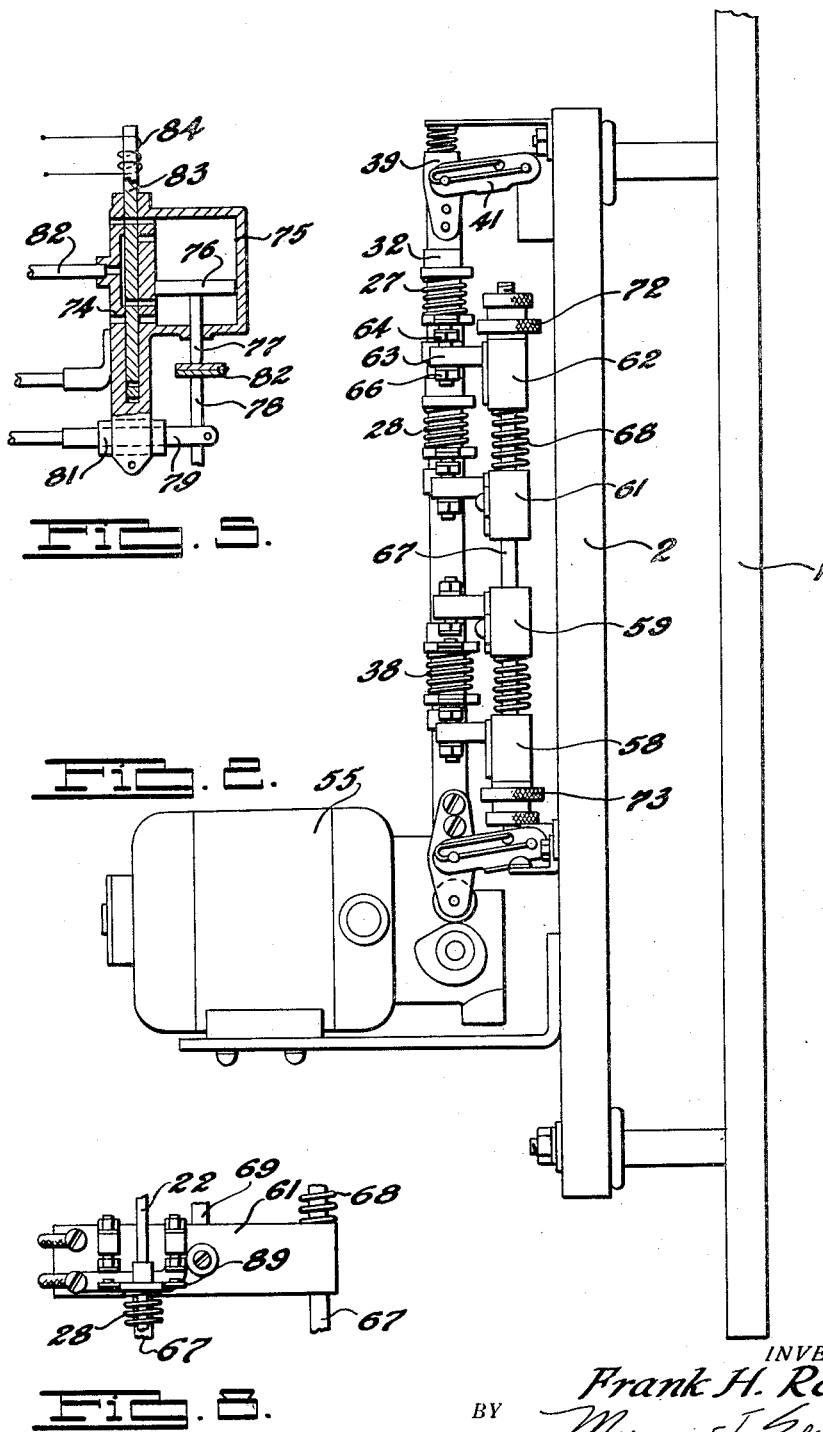
INVENTOR
Frank H. Roby
BY
ATTORNEY Oct. 28, 1941.  F. H. ROBY  2,260,405
METHOD AND SYSTEM OF WELDER CONTROL
Filed Nov. 3, 1937   3 Sheets-Sheet 3
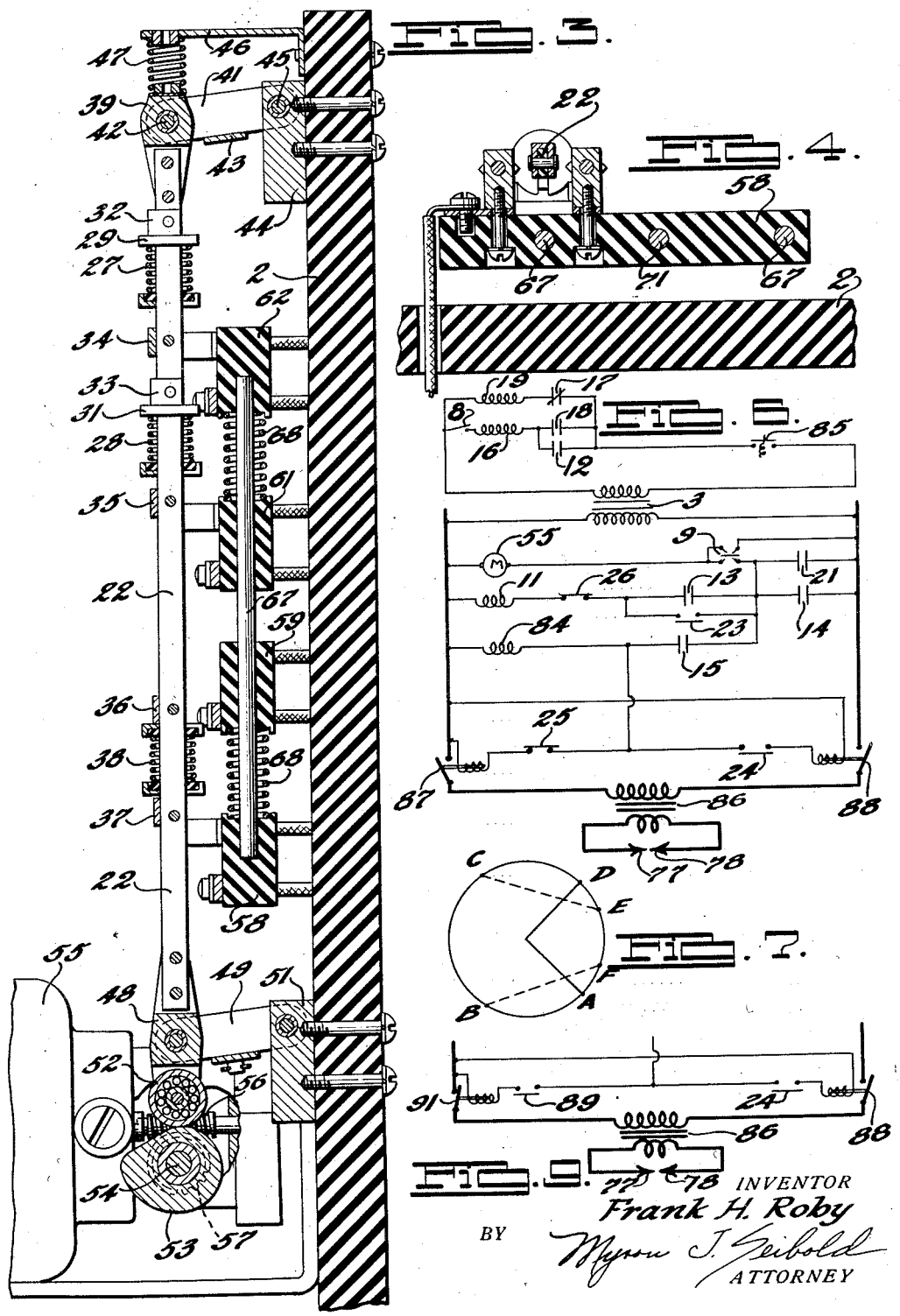
INVENTOR
Frank H. Roby
BY
Myron J. Seibold
ATTORNEY Patented Oct. 28, 1941

2,260,405

UNITED STATES PATENT OFFICE 2,260,405

METHOD AND SYSTEM OF WELDER CONTROL

Frank H. Roby, Milwaukee, Wis., assignor to Square D Company, Detroit, Mich., a corporation of Michigan Application November 3, 1937, Serial No. 172,586

23 Claims. (Cl. 219—4)

This invention relates to a method of and a system for electrically welding material and relates primarily to a synchronous system wherein the points of making and breaking of the circuit with reference to the applied voltage wave may be selected and maintained.

One object of the present invention is an improved method of electrically welding material by making and breaking the welding current at selected points upon the applied voltage wave and/or when the welding current has a predetermined instantaneous value.

Another object of the invention is an improved method of welding material by the sequential operation of contactors connected in series circuit in which one contactor is operated to closed position, the second contactor is actuated to closed position to initiate the welding current and the welding current is interrupted by opening the first closed contactor.

Another object of the invention is an improved method of electric welding by the sequential operation of contactors in which a normally closed and a normally opened contactor are serially connected in the circuit and in which the normally opened contactor is first energized to initiate the welding current and in which the normally closed contactor is thereafter operated to interrupt the welding current.

Another object of the invention is improved methods of welding material according to the two immediately preceding objects in which the points of initiation and interruption of the welding current are selected with respect to the applied voltage wave and/or with respect to the instantaneous value of the current.

Another object of the invention is a provision of a system for carrying out the methods of the preceding objects.

Another object of the invention is the provision of an electric welder control system which selects the point of initiation of the welding current to secure a minimum transient in the circuit and which selects the point of interruption of the current while the instantaneous value of the welding current is substantially zero and in which these points are independently adjustable.

Another object of the invention is an electric welder control system having the characteristics of the systems recited in the two immediately preceding objects and in which complete energization of the system to effect a welding cycle can only be effected in the "off" period of the welding cycle regardless of when the system is initially energized, and in which the system may be utilized for either continuous or for single welds and in which the synchronously driven part of the system may be relatively continuously driven or started upon the initiation of each or the first of a series of welds.

Another object of the invention is the provision of a method and a system for controlling electric circuits generally and having the characteristics of the methods and systems above set forth.

Other objects and features of this invention will be readily apparent to those skilled in the art from the following specification and appended drawings illustrating certain embodiments of the invention in which:

Figure 2 is a side elevational view of the panel shown in Figure 1.

Figure 3 is a vertical sectional view on the line III—III of Figure 1.

Figure 4 is a partial horizontal sectional view on the line IV—IV of Figure 1.

Figure 5 is a diagrammatic representation of a conventional welding machine to which the system and method of this invention may be applied.

Figure 6 is a schematic wiring diagram for the system.

Figure 7 is a diagrammatic representation of the periods in the cycle of control.

Figure 8 is a partial elevational view showing a slightly modified arrangement of contacts on the timing relay.

Figure 9 is a partial view showing a modified arrangement for the lower portion of the schematic wiring diagram of Figure 6 and utilizing a normally closed contactor for interrupting the supply circuit.

Figure 1:
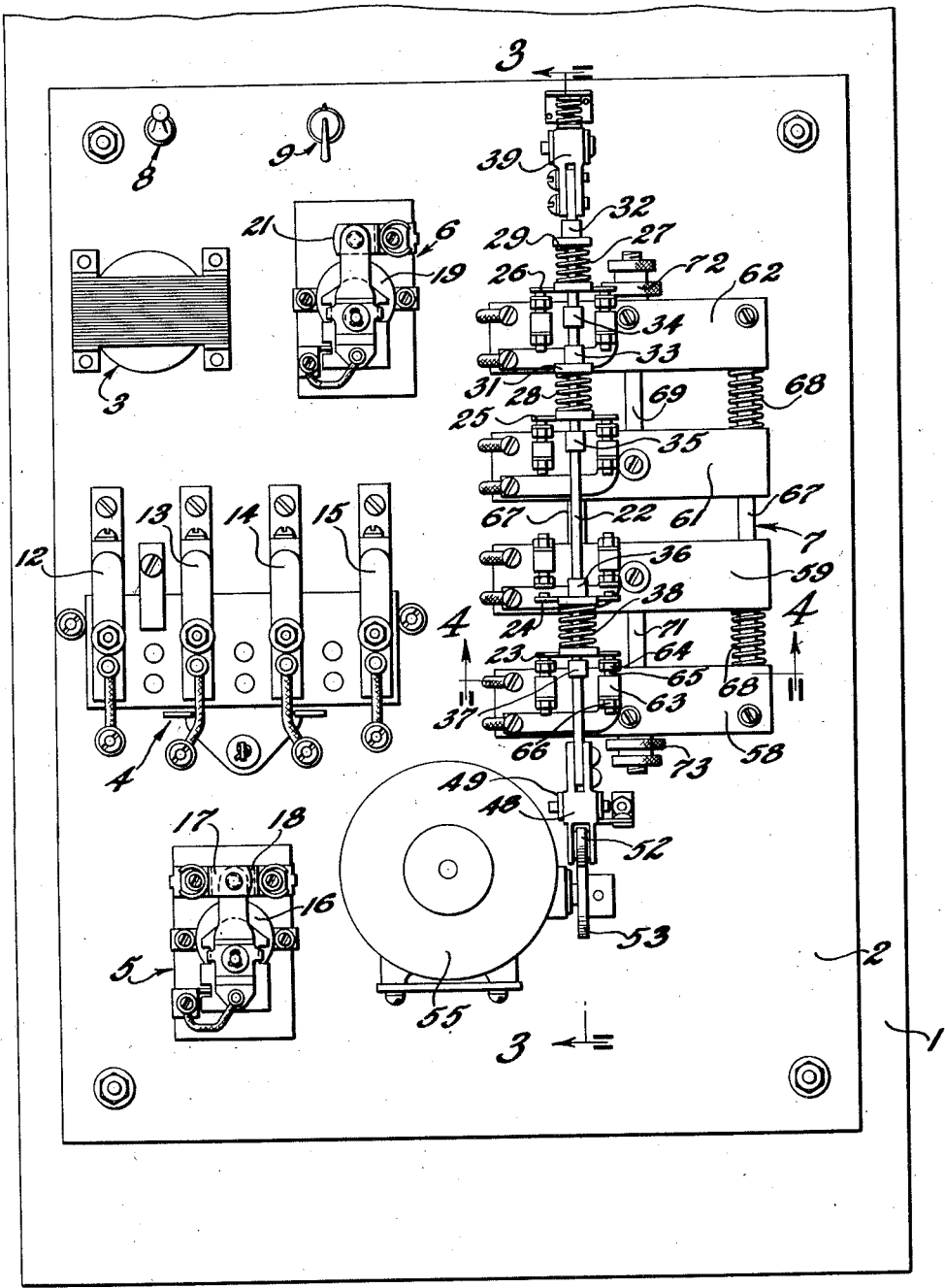
Figure 1 is a front elevational view of a control panel used in the method and system according to the present invention.

The control panel, according to the present invention, comprises a supporting or mounting plate 1 having removably mounted thereon a panel 2 which carries a transformer 3, a normally opened four pole electromagnetically operated relay 4, a single pole double throw electromagnetically operated relay 5, a single pole normally open electromagnetically operated relay 6, a timing relay 7, a conventional single pole snap switch 8, and a conventional single pole double throw switch 9. The relay 4 is of conventional form and its details of construction form no part of this invention. It is an electromagnetically operated relay of the normally open type having an operating coil 11 shown only schematically in Figure 6 and is provided with four sets of cooperating contacts 12, 13, 14 and 15. The relay 5 is an electromagnetically operated relay of the single pole double throw type whose details of construction form no part of this invention. It has an operating coil 16 and the contact closed when the coil 16 is deenergized is indicated at 17 and the contact closed when the coil 16 is energized is indicated at 18. The relay 6 is similar to the relay 5 except that the contact 17 is omitted. This relay has the operating coil 19 and the cooperating contacts 21.

The timing relay 7, as shown in Figures 1 to 4 inclusive, embodies a reciprocable insulating rod 22 having mounted thereon spring biased bridging contact elements 23, 24, 25 and 26. The contact elements 25 and 26 face downwardly so as to be opened by the upward stroke of the rod 22 and are biased downwardly by compression springs 27 and 28, disposed between their respective contact elements and washers 29 and 31 engageable with stops 32 and 33 on the rod 22. Also mounted on the rod 22 are stops 35 and 34 engageable respectively with the bridging elements 25 and 26 in the upward movement of the rod 22 to move the contact elements upwardly. The bridging contact elements 23 and 24 are biased toward stops 36 and 37 on the rod 22 by a compression spring 38 disposed between the elements. These contact elements face in opposite directions and the contact element 23 is opened by the upward movement of the rod 22, while the contact element 24 is closed by the upward movement of the rod. The rod 22 at its upper end is attached by means of studs, as shown, within a slot in a member 39 to which are pivotally connected a pair of arms 41 by means of a pivot pin 42. The arms 41 are rigidly connected by a cross piece 43 and are pivoted at their opposite ends to a base piece 44 as by means of pivot pin 45, the base piece 44 being rigidly mounted on the panel 2 by studs as shown. A stop bracket 46 is rigidly mounted on the panel 2 and a compression spring 47 disposed between the member 39 and the stop bracket 46 serves to bias the rod 22 in the downward direction. At its bottom end the rod 22 is similarly connected to a member 48 which are, in turn, pivotally mounted on arms 49 which are, in turn, pivotally supported on the base piece 51 rigid with the panel. The bottom end of the member 48 is provided with a ball bearing roller 52 which bears against the operating surface of a cam 53 which is rigidly mounted on a shaft 54 so that rotation of the shaft effects reciprocatory movement of the rod 22. The shaft 54 is driven by a synchronous electric motor 55 through a worm 56 driven by the motor and meshing with a gear 57 mounted on the shaft 54.

The operating motor 55 may be any conventional synchronously driven motor, but where the motor is to be started for each weld or the first in a series of welds as will be expounded hereinafter, it is desirable that the motor have fast accelerating characteristics so that it will synchronize within a very few cycles.

In the time relay 7 each of the bridging contact elements cooperates with a pair of spaced stationary contacts, certain of which are mounted for ready adjustment. These pairs of contact elements are mounted upon blocks 58, 59, 61 and 62. Each of these stationary contacts includes a post 63 extending forwardly of the supporting insulating block and having mounted thereon a contact surface 64 disposed upon a stud 65 threaded into the post 63 and maintained in place by a lock nut 66. The arrangement thus described not only provides means for mounting the stationary contacts, but also provides for adjustment of each stationary contact individually where desired. The top and bottom insulating blocks 58 and 62 are rigidly secured to the panel 3, and extending between these blocks are guide rods 67 upon which are slidably mounted the intermediate contact supporting insulated blocks 59 and 61. Compression springs 68 are provided between the top and bottom and the adjacent intermediate blocks, and serve to bias the block 61 away from the top block 62 and to bias the block 59 upwardly away from the lower block 58. Adjustment rods 69 and 71 are provided, the rod 69 being rigidly secured at one end to the block 61 and extending loosely through the block 62 and provided at this upper end with an adjusting nut 72. The rod 71 has one end rigidly connected to the block 59 and its other end loosely extending through block 58 and is provided with an adjusting nut 73. With this arrangement it is seen that means is provided for quick and easy adjustment for the position of the stationary contacts which cooperate with the bridging plates 24 and 25 merely by tightening or loosening the locking nuts 72 and 73 to shorten or extend the rods 69 and 71, and to thus effect movement bodily of the contact supporting blocks 61 and 59.

In Figure 5 is diagrammatically shown a welder machine which may be controlled by the elements previously described. This represents a frame 74 which includes a cylinder 75 within which is reciprocably mounted a piston 76 having attached thereto one welding electrode 77. The cooperating welding electrode 78 is supported within a holder 79 insulated from the frame 74 by the insulating bushing 81. One terminal of the secondary to the transformer is connected to the holder 79, and the other terminal is connected to the frame 74 through which it makes contact to the electrode 77. The material to be welded is indicated at 82. The frame includes therein a valve connected to a suitable source of fluid pressure as at 82 which valve is actuated by means of a slide 83 operated by the solenoid coil 84 in the upper direction and by gravity or a spring bias, not shown, in the downward direction when the coil is deenergized. In the position of the parts as shown a weld has been completed and the coil 84 deenergized so that valve 83 has been moved to its downward position. In this position, as shown, the fluid pressure is connected to that portion of the cylinder 75 below the piston 76 which will now move upwardly, venting the fluid above the piston through the small port at the top of the frame. This will move the electrode 77 out of contact with the work, so as to permit relative movement between the welding machine and the work. When the operating coil 84 of the solenoid valve is energized, the valve slide 83 will be moved upwardly to place the entrance port above the piston into contact with the fluid pressure, whereupon the piston will move downwardly, bleeding the fluid below the piston from the cylinder through the port adjacent the bottom of the cylinder.

Figure 6 illustrates the schematic wiring diagram for the welder control system incorporating the parts previously described and includes in addition a normally open conventional type push button 85, the welding transformer 86, and a pair of single pole normally open contactors 87 and 88 connected in the primary leads to the welding transformer 86.

In the operation of the system to carry out the method of the present invention the proper worm and gear arrangement 56—57 is selected to give the desired number of welds per minute. A cam 53 is selected which will give the desired off period. It is noticed that with the use of the timing relay 7 all of the timing operations for the weld are carried out in the upward movement of the rod 22 and the off period in the cycle is determined by the downward movement of the rod. The cam 53 will ordinarily be proportioned so that the off period will be established at the lowest practical value without causing the cam to be too steep. The only adjustment of the off time provided is the shape of the cam. In actual practice a fan cam may be used to permit ready adjustment. With the driving gear ratio and the cam shape selected it is only necessary to adjust the position of the contact supporting blocks 59 and 61 to secure the desired periods in the welding cycle and the synchronizing points. The space between the contact supporting block 58 and the contact supporting block 59 which is varied by means of the adjusting nut 73 determines the delay period in the welding cycle. This period may be set at any value desired to permit the building up of the proper pressure upon the welding electrodes before the initiation of the welding current. By varying the position of the contact supporting block 59 the point on the reference voltage wave at which the welding current is initiated may be varied. This is selected in any desired manner to secure the minimum transient in the circuit upon the initiation of the welding current. This point, assuming a 90° lag in the flux, will ordinarily occur at the maximum point on the voltage wave. The spacing between the blocks 59 and 61 determine the duration of the flow of welding current and after the selection of the minimum transient point by means of the location of the block 59, the position of the block 61 is varied by means of the adjusting nut 72 to give the desired number of cycles for flow of welding current and to interrupt the welding current just prior to the passing of the current through zero in order to avoid the possibility of prolonged arcing at the contact tips of the contactor with its attendant inaccuracies in the timing of the duration of the applied current as well as to minimize the arcing at the contactor with attendant elimination of burning and greater life. Theoretically the placing of the contact supporting block 61 for optimum operating conditions would be exactly at the point where the welding current has an instantaneous value of zero. However, in practice, it is desired to set this point slightly before the current reaches an instantaneous value of zero in order to insure the interruption of the arc at the zero point. The spacing between the contact supporting blocks 61 and 62 determines the hold period in the welding cycle in which the current no longer flows but pressure is maintained upon the welding electrodes. This period is set when the contact supporting block 61 is properly adjusted for welding time and synchronizing point but may be varied with consequent variation in delay time by varying the positions of both the blocks 59 and 61.

The operation of the welder control system to carry out the methods of the present invention will now be described. After the selections and adjustments described in the preceding paragraph have been made the control may be operated in desired manner by the selection of the proper positions of switches 8 and 9 and thereafter controlled solely by the application of the push button 85. Assuming the switch 8 to be opened and the selector switch 9 to be operated to a position to bridge the upper lefthand and the lower right hand contacts the operation is as follows:

Upon closing of the push button 85 a circular will be established through the normally closed contact 17 of relay 5 to the operating coil 19 of relay 6. The relay 6 then operates to close the contact 21. Closing of contact 21 establishes a circuit through the motor 55 which quickly comes up to speed and into synchronism in the minimum time possible. Regardless of the position of the contacts and the operating rod in the timing relay 7 no further energization of the system will be effected until the rod is in its lowest position wherein the contact 23 is closed for a short interval. When contact 23 closes it establishes a circuit through the operating coil 11 of relay 4 which is thus operated to closed position closing contacts 12, 13, 14 and 15. Contact 13 comprises a holding circuit for the operating coil 11 to maintain the relay 4 in closed position regardless of subsequent opening of the contact 23. Contact 14 forms a holding circuit around contact 21 so that opening of the push button 85 at this point which will drop out relay 6 does not, however, stop the operation of the system. Through contact 15 of the control relay 4 the operating coil 84 of the solenoid valve on the welding machine is energized to apply pressure to the welding electrodes. At the same time the contactor 87 is energized and moves to closed position through the contact 25 which is closed at this time. As the motor 55 continues to operate and the cam 53 to rotate, the rod 22 will be moved in an upward direction and will open contact 23 almost immediately after its closing. This, however, has no effect on the system in view of the holding circuits established by the control relay 4. Upon further movement upwardly the rod 22 first effects closing of the contact 24. This energizes contactor 88 and effects closing thereof to initiate the flow of welding current. In its continued upward movement the rod 22 thereafter effects opening of contact 25 which deenergizes the contactor 87 and effects interruption of the welding current. Upward movement of the rod 22 continues until at the top of its stroke the contact 26 is open for a very short period thus deenergizing the control relay 4 which opens, effecting deenergization of the solenoid valve operating coil 84 and of the motor 55 providing the push button 85 has been released. However, with this position of the switch 8, should the operator continue to hold the push button 85 closed the motor circuit will remain established through contact 21 of relay 6 and the welding cycle will continue to effect a plurality of complete operations so long as the push button 85 remains depressed.

With the switch 8 closed provision is made for a single weld and the system will here not operate to produce a continuous series of welds regardless of the holding in of the push button. With the switch 8 closed the closing of relay 4 will energize the operating coil 16 of relay 5 through the contact 12 of the relay 4. The operation of the relay 5 opens the normally closed contact 17 and closes the normally open contact 18. The opening of contact 17 interrupts the circuit to the operating coil 19 of relay 6 so that the contact 21 opens. The closing of contact 18 effects a holding circuit for the operating coil 16 regardless of subsequent opening of contact 12 on the relay 4. In this arrangement when the contact 26 is opened and the relay 4 dropped out the control system will be deenergized since both contacts 14 and 21 will be open. It is seen that in view of the holding circuit formed by the closing of contact 18 the relay 5 will remain energized until push button 85 is released. Subsequent closing of the push button will permit another single weld to be made.

The selector switch 9 determines whether or not the motor 55 is started for each weld or the first in a series of welds or whether the motor runs continuously. When the selector switch is rotated to bridge the upper right hand and the lower left hand contacts it is seen that the motor 55 is continuously connected to the line. Which connection is used will, of course, depend upon the accelerating characteristics of the motor and the period of "hunting" before absolute synchronization takes place. If the delay period in the welding cycle can be established for the interval of the accelerating and "hunting" of the motor then it is entirely feasible to start the motor upon the initiation of a welding cycle. For individual spot welds it has been found more feasible to allow the motor to run continuously since the question of proper synchronization arises in connection with each weld. However, in the use of the control for a series of welds it has been found quite satisfactory to start the motor upon the initiation of the series. It is to be particularly noted that regardless of whether the motor is continuously operating or is started upon the initiation of a weld or a series of welds that the welding circuit cannot be energized to effect the welding cycle until the control relay closes which is effected only at the lowest position of the rod 22 when the contact 23 is closed for a short interval. This insures that the cycle will always be carried out in its proper order regardless of the position of the rod 22 when the push button 85 is depressed.

Figure 7 illustrates the cycle of operation of the system wherein point A represents the point of very short closing of the bridging contact 23. Point B represents the point in the cycle at which bridging contact 24 closes. Point C represents the point in the cycle at which the contact 25 is opened, and point D represents the point of very short opening of contact 26. At point E in the downward movement of the operating rod 22, the contact 25 closes and at point F in the downward movement of the rod, the contact 24 opens. From this cycle and from the shape of the cam more thoroughly shown in Figure 3, it is apparent that the upward movement of the rod 22 will occur through approximately ¾ of the rotation of the shaft 54 while the downward movement of the rod will be effected by only ¼ rotation of the shaft 54. The short arc DEFA therefor represents the downward movement of the rod, while the long arc ABCD represents the upward movement of the rod. Regardless of the position of the rod 22 in the diagram illustrated the welding circuit can only be energized at the point A where contact 23 closes for a short interval. The arc AB represents the rotation of the cam shaft during the delay period since at point A the solenoid valve operating coil 84 is energized. With the closing of contact 24 at the point B the welding current is initiated and the arc BC represents the rotation of the cam shaft while the welding current is flowing. At the point C the contact 25 opens to deenergize contactor 87 to interrupt the welding current. The point D, where the contact 26 opens for a short interval, represents the deenergization of the control relay 4 and of the solenoid valve operating coil 84. Hence the arc CD represents the hold period in which pressure is maintained after the welding current is interrupted. The closing of contact 25 at the point E and the opening of contact 24 at the point F have no effect upon the system since the control relay 4 was deenergized at the point D. Hence the arc DEFA corresponds to the off period in the welding cycle. The arc AB is determined by the distance between contact supporting blocks 58 and 59. The arc BC is determined by the distance between contact supporting blocks 59 and 61 and the arc CD is determined by the distance between the supporting blocks 61 and 62. The arc DEFA is determined by the shape of the operating cam. The point B is the one selected to effect closing of the welding circuit at the point of minimum transient and the point C is the point selected just prior to the passing of the welding current through its instantaneous zero value. The arc BC will be determined by the period of flow of the welding current and will thus definitely limit the spacing between the supporting blocks 59 and 61. However, both these blocks may be moved together to vary the relative proportion of the cycle which is expended in the arcs AB and CD corresponding to the delay and hold periods in the welding cycle.

In some instances it may be desired to operate the contactors 87 and 88 to open and closed positions simultaneously rather than sequentially as previously described. This has the advantage of interrupting the welding current at two points with resulting longer contact tip life and permissive heavier loading of the contactors. However, the sequential operation is preferred where very short timing, for example of two cycles or less, is desired. Where the parallel operation of the contactors is desired it is only necessary to connect their operating coils in parallel and both in series with contacts 24 and 25. With this arrangement closing of contact 24 will effect simultaneous closing of both contactors and opening of contact 25 will effect simultaneous opening of both contactors.

Figure 8 is a partial view illustrating a modification of the timing relay 7 in which the contact 89, which corresponds to the contact 25 in position, is reversely directed so as to be closed by the upward movement of the rod 22. This construction of the timing relay is adapted to be used in connection with the modified wiring arrangement shown in the modification of Figure 9 and to take the place of the lower portion of the schematic wiring diagram of Figure 6, the upper portion remaining the same. Here the normally open contactor 87 is replaced by a normally closed contactor 91 which is opened when its operating coil is energized.

The operation of this system is exactly the same as that previously described except that the contact 89 is open when the rod 22 is in its lower position instead of closed as in the system previously described. Hence at the point C in the system the contact 89 closes to effect energization of the contactor 91 to interrupt the welding circuit instead of the opening of contact 25 to effect deenergization of the contactor 87 to effect opening of the welding circuit. The construction illustrated in Figures 7 and 8 may be desired in some instances as the energization of a normally closed contactor to effect opening thereof can normally be carried out more positively than the deenergization of a normally open contactor. In all other respects the systems are identical.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What is claimed is:

1. The method of electrically welding material by passing current through the material between electrodes pressed thereagainst which comprises initiating the electrode pressure, closing one set of cooperating contacts in the circuit supplying current to said electrode while maintaining the circuit open at a second set of cooperating contacts, closing said second set of contacts a predetermined time interval after initiation of said electrode pressure and substantially at a predetermined point on the supply wave, and opening said one set of cooperating contacts a predetermined time interval after the closing of the second set of cooperating contacts and substantially at a point when the welding current has an instantaneous value of zero.

2. The method of electrically welding material by passing current through the material between electrodes pressed thereagainst which comprises initiating said electrode pressure, energizing a normally open electromagnetic contactor in the circuit supplying current to said electrodes to initiate the flow of welding current substantially at a predetermined point on the supply wave, energizing a normally closed electromagnetic contactor in said circuit a predetermined time interval after the closing of said first mentioned contactor to effect interruption of the welding current and substantially at a point when the welding current has an instantaneous value of zero, and releasing said electrode pressure a predetermined time interval after the operation of said normally closed contactor.

3. The method of electrically welding material by passing current through the material between electrodes pressed thereagainst which comprises initiating the operation of synchronously driven means, energizing a control relay when said synchronously driven means is in a predetermined position, initiating the electrode pressure and closing one set of cooperating contacts in the circuit supplying current to said electrodes while maintaining the circuit open at a second set of cooperating contacts upon energization of said control relay, closing said second set of cooperating contacts at a second predetermined position of said synchronously driven means and substantially at a predetermined point on the supply wave, and opening the first set of contacts at a third predetermined position of said synchronously driven means and substantially at a point when the welding current has an instantaneous value of zero.

4. The method of electrically welding material by passing current through the material between electrodes pressed thereagainst which comprises initiating the operation of synchronously driven means, energizing a control relay when said synchronously driven means is in a predetermined position, initiating the electrode pressure and closing one set of cooperating contacts in the circuit supplying current to said electrodes while maintaining the circuit open at a second set of cooperating contacts upon energization of said control relay, closing said second set of cooperating contacts at a second predetermined position of said synchronously driven means and substantially at a predetermined point on the supply wave, and opening the first set of contacts at a third predetermined position of said synchronously driven means and substantially at a point when the welding current has an instantaneous value of zero, and deenergizing said control relay at a fourth predetermined position of said synchronously driven means to effect release of said electrode pressure and opening of said first set of contacts.

5. The method of electrically welding material by passing current through the material between electrodes pressed thereagainst which comprises initiating the operation of synchronously driven means, energizing a control relay when said synchronously driven means is in a predetermined position, initiating the electrode pressure and closing one set of cooperating contacts in the circuit supplying current to said electrodes while maintaining the circuit open at a second set of cooperating contacts upon energization of said control relay, closing said second set of cooperating contacts at a second predetermined position of said synchronously driven means, and opening the first set of contacts at a third predetermined position of said means.

6. The method of electrically welding material by passing current through the material between electrodes pressed thereagainst which comprises initiating the operation of synchronously driven means, energizing a control relay when said synchronously driven means is in a predetermined position, initiating the electrode pressure and closing one set of cooperating contacts in the circuit supplying current to said electrodes while maintaining the circuit open at a second set of cooperating contacts upon energization of said control relay, closing said second set of cooperating contacts at a second predetermined position of said synchronously driven means, opening the first set of contacts at a third predetermined position of said means, and deenergizing said control relay to release the electrode pressure and open said second set of contacts at a fourth predetermined position of said means.

7. The method of electrically welding material by passing current through the material between electrodes pressed thereagainst which comprises initiating the operation of synchronously driven means, energizing a control relay when said means is in a predetermined position, initiating the electrode pressure upon energization of said control relay, initiating the flow of welding current at a second predetermined position of said synchronously driven means, and interrupting said welding current at a third predetermined position of said means.

8. The method of electrically welding material by passing current through the material between electrodes pressed thereagainst which comprises initiating the operation of a synchronously driven reciprocatory member, energizing a control relay when said member is in one extreme position only, initiating the electrode pressure upon energization of said control relay, initiating the flow of welding current at a predetermined intermediate position of said member but only after energization of said control relay, interrupting the welding current at a second intermediate predetermined position of said member, and deenergizing said control relay at the opposite extreme position of said member to release said electrode pressure.

9. The method of electrically welding material by passing current through the material between electrodes pressed thereagainst which comprises initiating the operation of a synchronously driven reciprocatory member, energizing a control relay when said member is in one extreme position only, initiating the electrode pressure upon energization of said control relay, initiating the flow of welding current at a predetermined intermediate position of said member but only after energization of said control relay, interrupting the welding current at a second intermediate predetermined position of said member, deenergizing said control relay at the opposite extreme position of said member to release said electrode pressure, and adjusting said first predetermined intermediate position to give substantially a minimum transient in the welding circuit.

10. The method of electrically welding material by passing current through the material between electrodes pressed thereagainst which comprises initiating the operation of a synchronously driven reciprocatory member, energizing a control relay when said member is in one extreme position only, initiating the electrode pressure upon energization of said control relay, initiating the flow of welding current at a predetermined intermediate position of said member but only after energization of said control relay, interrupting the welding current at a second intermediate predetermined position of said member, deenergizing said control relay at the opposite extreme position of said member to release said electrode pressure, and adjusting said second mentioned predetermined intermediate position to interrupt the current substantially at a point when it has an instantaneous value of zero.

11. The method of electrically welding material by passing current through the material between electrodes pressed thereagainst which comprises initiating the operation of a synchronously driven reciprocatory member, energizing a control relay when said member is in one extreme position only, initiating the electrode pressure upon energization of said control relay, initiating the flow of welding current at a predetermined intermediate position of said member but only after energization of said control relay, interrupting the welding current at a second intermediate predetermined position of said member, deenergizing said control relay at the opposite extreme position of said member to release said electrode pressure, and independently adjusting said intermediate positions to effect initiation of the welding current substantially at a point to give a minimum transient in the welding circuit and to effect breaking of the welding circuit substantially at a point when the current has an instantaneous value of zero.

12. In a welder control system for electrically welding work by passing current therethrough between electrodes pressed against the work, means for applying pressure to the electrodes, serially connected normally open electromagnetically operated contactors for controlling the energization and deenergization of the electrodes, means for energizing one of said contactors, means for energizing the other of said contactors to initiate the welding current, and means for deenergizing said one of said contactors a predetermined time interval after the energization of said second contactor to interrupt the welding current.

13. In a welder control system for electrically welding work by passing current therethrough between electrodes pressed against the work, means for applying pressure to said electrodes, serially connected normally open electromagnetically operated contactors for controlling the energization and deenergization of the electrodes, means for closing one of said contactors, means for closing the second contactor substantially at a point giving a minimum transient in the circuit, and means for deenergizing said one contactor a predetermined time interval thereafter and effecting opening thereof substantially at a point when the welding current has an instantaneous value of zero.

14. In a welder control system for electrically welding work by passing current therethrough between electrodes pressed against the work, means for applying pressure to said electrodes, a normally closed and a normally open electromagnetically operated contactor serially connected to control the energization and deenergization of the electrodes, means for energizing said normally open contactor to effect closing thereof substantially at a point giving a minimum transient in the circuit, and means for energizing said normally closed contactor to effect opening thereof substantially at a point when the welding current has an instantaneous value of zero.

15. In a welder control system for electrically welding work by passing current therethrough between electrodes pressed against the work, a plurality of independently operating sets of cooperating contacts, synchronous motor driven means for operating said contacts in a predetermined sequence, an operating relay, means for optionally connecting said motor directly to the line for continuous operation or to the line through said relay contacts for initial operation only in response to closing of said relay, and means controlled by said sets of cooperating contacts for initiating electrode pressure and for controlling the passage of welding current through the material.

16. In a welder control system for electrically welding work by passing current therethrough between electrodes pressed against the work, a plurality of independently operating sets of cooperating contacts, synchronous motor driven means for operating said contacts in a predetermined sequence, an operating relay, means for optionally connecting said motor directly to the line for continuous operation or to the, line through said relay contacts for initial operation only in response to closing of said relay, and means controlled by said sets of cooperating contacts for initiating electrode pressure and for controlling the passage of welding current through the material, including means preventing functional operation of said sets of contacts except in the proper sequence to carry out a complete welding cycle.

17. In a welder control system for electrically welding work by passing current therethrough between electrodes pressed against the work, synchronous motor operated means for effecting operation of the elements of the welder system in a predetermined sequence including the closing and breaking of the supply circuit at predetermined points on the supply voltage wave, relay means for initiating a welding cycle and additional relay means automatically operable in the cycle to deenergize said first mentioned relay means to prevent a repetition of the cycle.

18. In a welder control system for electrically welding work by passing current therethrough between electrodes pressed against the work, synchronous motor operated means for effecting operation of the elements of the welder system in a predetermined sequence including the closing and breaking of the supply circuit at predetermined points on the supply voltage wave, relay means for initiating a welding cycle and additional relay means automatically operable in the cycle to deenergize said first mentioned relay means to prevent a repetition of the cycle, and means for optionally disconnecting said relay means to provide for repetition of the welding cycle.

19. In a welder control system for electrically welding work by passing current therethrough between electrodes pressed against the work, a plurality of sets of cooperating contacts, synchronous motor driven means for operating said contacts in a predetermined cycle, a relay for connecting said motor to the line, an operating switch for energizing said relay, a control relay energized through one set of said cooperating contacts when said means is in a predetermined position and operating to place the energization and deenergization of the electrodes under the control of other of said sets of contacts, certain contacts of said control relay forming a shunt about contacts of the first mentioned relay, a third relay energized by the closing of said control relay and operating to open the circuit through said first mentioned relay and to maintain the circuit open to effect deenergization of the system upon opening of the control relay after a complete welding cycle and prevent repetition thereof.

20. In a welder control system for electrically welding work by passing current therethrough between electrodes pressed against the work, a plurality of sets of cooperating contacts, synchronous motor driven means for operating said contacts in a predetermined sequence, means for connecting said motor to the supply upon the initiation of a welding cycle, a control relay energized by a set of said contacts in one predetermined position of said synchronous motor driven means, said relay completing circuits through other sets of said contacts whereby energization and deenergization of the electrodes is placed under the control of said other sets of said contacts.

21. In a welder control system for electrically welding work by passing current therethrough between electrodes pressed against the work, a plurality of sets of cooperating contacts, synchronous motor driven means for operating said contacts in a predetermined sequence, means for effecting relatively continuous operation of said motor independently of the welder operations, a control relay, control means for effecting energization of said control relay, said control means being ineffective to effect such energization except in a predetermined position of said synchronous motor driven means, said control means connecting circuits to other sets of said contacts to place the energization and deenergization of the electrodes under the control of said other sets of said contacts.

22. In a welder control system for electrically welding work by passing current therethrough between electrodes pressed against the work, a plurality of sets of cooperating contacts, synchronous motor driven means for operating said contacts in a predetermined sequence, means for effecting relatively continuous operation of said motor independently of the welder operations, a control relay, control means for effecting energization of said control relay, said control means being ineffective to effect such energization except in a predetermined position of said synchronous motor driven means, said control means connecting circuits to other sets of said contacts to place the energization and deenergization of the electrodes under the control of said other sets of said contacts, and electrical means automatically operated in the welding cycle for preventing the energization of said control relay through said control means.

23. In a welder control system for electrically welding work by passing current therethrough between electrodes pressed against the work, a plurality of sets of cooperating contacts, synchronous motor driven means for operating said contacts in a predetermined cycle, means for effecting relatively continuous operation of said motor independently of the welding operations, electromagnetically operated valve means controlling the application of fluid pressure to said electrodes, serially connected electromagnetic contactors for controlling the passage of current through the work, an auxiliary relay, one set of said cooperating contacts effecting energization of said auxiliary relay in only a predetermined position of said synchronous motor driven means, means energizing one of said contactors and said valve means upon the closing of said relay, a second set of said contacts effecting closing of the second contactor in a second predetermined position of said synchronous motor driven means to initiate the flow of welding current, a third set of cooperating contacts deenergizing said first contactor to interrupt the welding current in a third predetermined position of said means, and a fourth set of contacts operating to effect denergization of said relay in a fourth predetermined position of said means, the sets of contacts other than said first mentioned set being inoperative to perform any function until said relay is energized by said first set of contacts.

FRANK H. ROBY.